Feb. 11, 1969

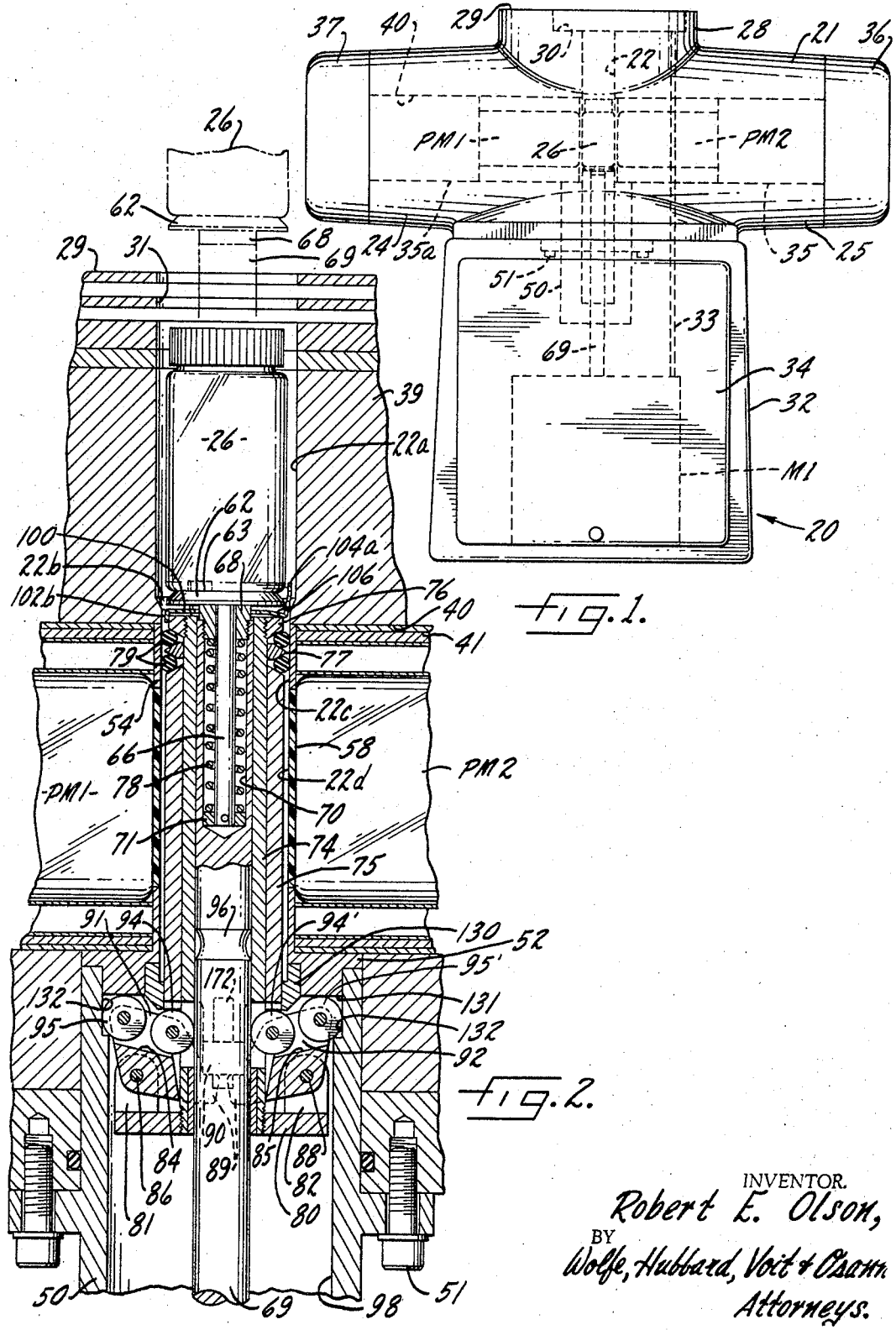

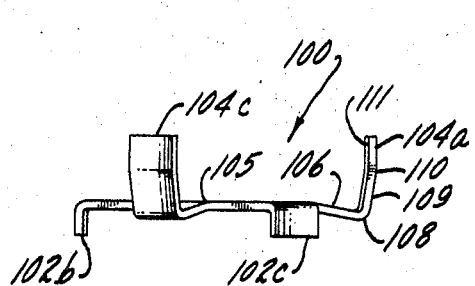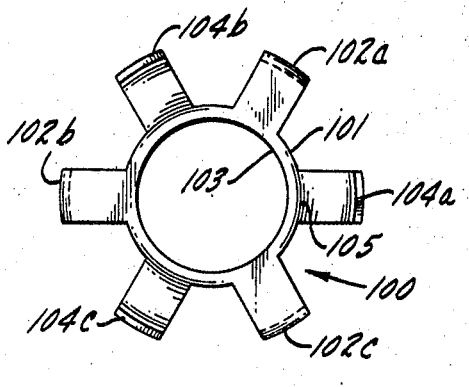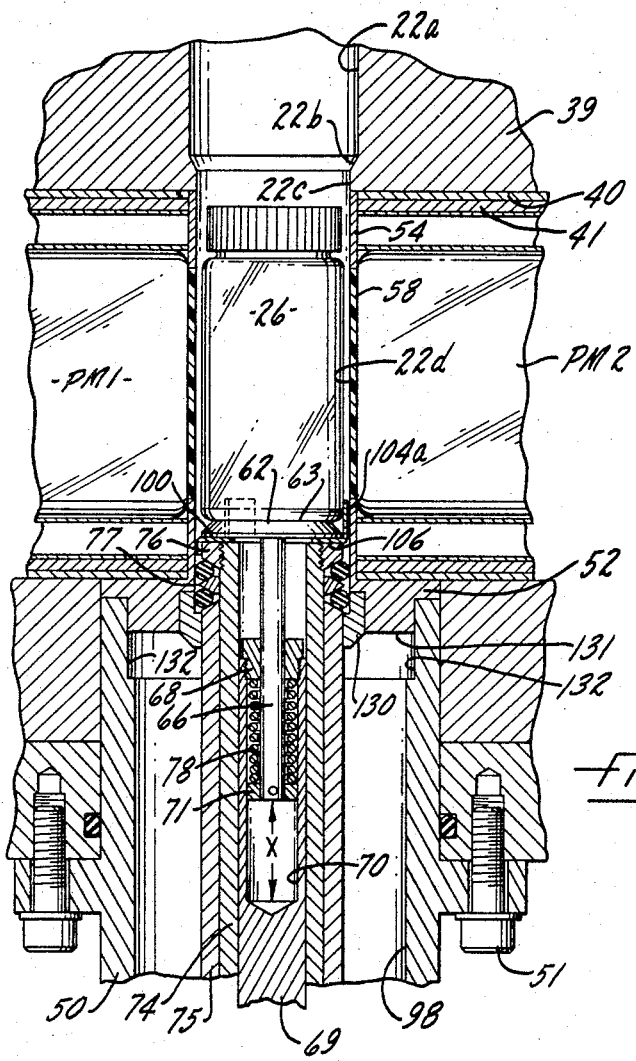

R. E. OLSON 3,426,919

SAMPLE CENTERING DEVICE FOR RADIATION
DETECTING AND MEASURING APPARATUS

Filed April 13, 1965

INVENTOR.
Robert E. Olson,
BY Wolfe, Hubbard, Voit & Osann
Attorneys.

United States Patent Office 3,426,919
Patented Feb. 11, 1969

3,426,919
SAMPLE CENTERING DEVICE FOR RADIATION DETECTING AND MEASURING APPARATUS
Robert E. Olson, Glen Ellyn, Ill., assignor to Packard Instrument Company, Inc., Downers Grove, Ill., a corporation of Delaware
Filed Apr. 13, 1965, Ser. No. 447,831
U.S. Cl. 214—1                    6 Claims
Int. Cl. B25j 3/00; G01n 23/00

ABSTRACT OF THE DISCLOSURE

In an apparatus for detecting and measuring radioactivity, and including a sample-transferring well, an elevator, and a radiation detection chamber, means are provided for centering a sample on the elevator, and therefore also with respect to the detection chamber. The sample centering means is a spring-like member having an inverted dished central portion and upstanding sample-gripping fingers; biasing the central portion urges the fingers inwardly so as to center the sample.

---

The present invention relates in general to apparatus for detecting and measuring radioactivity emanating from a sample and, more particularly, to elevator mechanisms for lowering vials or the like containing a liquid scintillator and a radioactive isotope to be measured into a light detection chamber, and for subsequently ejecting the vial from the detection chamber upon completion of a counting cycle. Specifically, the present invention concerns a device for centering sample vials within the detection chamber.

Apparatus has heretofore been described for automatically transferring radioactive samples into the detection chamber of a scintillation counter in such a way as to avoid the leakage of any outside light into the chamber. Particularly useful transfer mechanisms, capable not only of preventing outside light from entering the chamber but of avoiding static electric charges produced within the chamber by the rubbing of plastic components, are described in Olson application Ser. No. 273,110, filed Apr. 15, 1963, now U.S. Patent No. 3,198,948, and in Roy E. Smith application Ser. No. 445,956, filed Apr. 6, 1965. An object of the present invention is further to improve sample transfer mechanisms by providing a means for entirely eliminating any static electric charges.

While not so limited in its application, the invention will find especially advantageous use in conjunction with radioactivity detecting apparatus of the type employing a "light pipe" for maximizing the conversion of scintillation light flashes into signal information since such "light pipes" are commonly made of light transmissive plastic material which tends to produce a relatively high number of spurious counts in the detecting equipment when subjected to rubbing contact with portions of the vial or transport mechanism. Not only do plastic "light pipes" tend to produce a relatively large amount of static electricity, and hence a great number of spurious signals, when subject to rubbing contact, but "light pipes" tend to produce such spurious signals for a longer period of time after being subjected to rubbing contact than do other substances.

It has now been found pursuant to the invention that a particularly troublesome cause of this rubbing is produced by the sample vial itself rubbing the "light pipes." Accordingly, an important object of the invention is to provide a means for eliminating rubbing contact between the sample vial and the walls of "light pipes." A related object is to provide such means in a form wherein it may be incorporated into existing sample transfer mechanisms as well as being included with new ones.

Another major objective of the invention is to provide a means for improving the precision and accuracy of radiation measurement devices by centering the sample vial between a pair of photomultipliers. Scintillation counters commonly employ a pair of matched photomultiplier tubes, with the sample placed between the two. Should the sample be closer to one tube than to the other then, notwithstanding the use of "light pipes" the closer tube may register a higher counting rate. This may make successive radioactivity measurements unrepeatable.

In a general aspect, it is an object of the invention to provide an improvement for sample transfer mechanisms which is characterized by its versatility and which can be used with substantially equal facility with virtually all of the automatic sample changers and sample transfer mechanisms which are now available on the commercial market.

In another of its important aspects, it is an object of the invention to provide an improved vial handling system which not only insures smooth and substantially jam-proof transfer of successive vials to and from the sample transfer elevator, but which also insures positive centering of the vials relative to the axis of the counting chamber so that each vial is transferred to and from the detection chamber with complete freedom from rubbing contact with defining wall thereof. As a consequence of attaining the foregoing objective, each sample vial occupies precisely the same position with respect to the light sensitive photomultipliers during the counting cycle as do all other vials, thereby insuring that each count recorded is completely significant with respect to all previous and subsequent counts, irrespective of whether the latter are performed repetitively on successive samples or whether a given sample is counted once, removed from the counting chamber, and later reinserted and recounted.

A more specific object of the invention is to provide an improved vial centering device which serves not only to center the vials on the axis of the counting chamber, but which is itself self-centering and which is completely independent of any deviation between the detection chamber axis and the axis of the elevator or transport mechanism.

A still further object of the invention is the provision of an improved vial centering device which is void of moving parts, is economical of fabrication, may be easily installed in virtually any sample changer of the type employing a vertical elevator shaft, and which requires little or no maintenance.

Other objects and advantages of the invention will become apparent as the following description proceeds, taken in conjunction with the accompanying drawings, in which:

FIGURE 1 is a front elevational view of an exemplary sample measuring apparatus having a sample transfer mechanism embodying the features of the present invention;

FIG. 2 is an enlarged, fragmentary, vertical sectional view of the apparatus of FIG. 1 and illustrating details of the sample transfer mechanism. the mechanism here being shown during the initial portion of upward elevator movement;

FIG. 3 is an enlarged elevation of one form of sample centering device embodying features of the invention, the device being shown here (and in FIG. 2 on a smaller scale) in its relaxed position;

FIG. 4 is an enlarged top or plan view of the sample centering device of FIG. 3;

FIG. 5 is an enlarged, fragmentary, vertical sectional view of the apparatus of FIG. 1, here showing the sample transfer mechanism in the down or "sample loaded" position with the sample to be analyzed disposed between a pair of light transducers;

Figure 6:
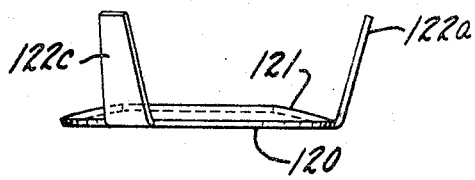
FIGS. 6 and 7 are enlarged elevational and plan views, respectively, similar to FIGS. 3 and 4 of a slightly modified sample centering device also embodying the features of the present invention.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Referring now to the drawings, there is illustrated in FIG. 1 an exemplary radiation detecting and measuring apparatus, generally indicated at 20, which is suitable for measuring the radioactive energy levels of test samples in accordance with the features of the present invention. As the ensuing description proceeds, it will become apparent that the present invention will find particularly advantageous use with radiation detecting equipment of the type used in detecting and measuring the activity or energy level of a test sample wherein a radioactive source is disposed within a solution containing a liquid scintillator, the latter having the characteristic property of producing light flashes when subjected to ionizing radiation. Such detectors are commonly referred to as "liquid scintillation detectors." The present apparatus 20 is primarily intended to receive and process sample vials containing such a liquid scintallator and radioactive source.

For this purpose, the apparatus 20 includes an outer housing, or shield and base assembly 21, which defines a vertically disposed detection well 22 adapted to receive sample vials one at a time in seriatim order. The shield and base assembly 21 is provided with a pair of laterally extending arms, 24, 25 which serve to house proportional light transducers characterized by their ability to detect light scintillations in the sample vials and to convert such light scinitillations into electrical signals, for example, voltage pulses which are proportional in amplitude to the light flash that causes the pulse. Such light transducers are well known in the art and need not be described in detail. As best shown in FIG. 1, the transducers may simply comprise a pair of photomultipliers PM1, PM2 which are mounted in oppositely disposed, coaxial, spaced relationship in the arms 24, 25 of the shield and base assembly 21. Thus, the photomultipliers are positioned on opposite sides of the detection well 22 so that sample vials 26 which are introduced into the well are mounted therebetween in light transmissive relationship therewith. The upper end of the shield and base assembly 21 comprises a generally cylindrical flange portion 28 having a planar upper surface 29 substantially coaxial with the detection well 22 and defining a cylindrical bore 30 suitable for receiving a shutter mechanism generally indicated at 31 (FIG. 2), of the type described in the aforesaid copending Olson application. The lower end of the shield and base assembly includes a generally box shaped housing or stand 32 suitable for housing control components used in conjunction with the apparatus 20. As shown in FIG. 1, the housing 32 may be provided with an access door 34 which permits of ease in both installation and servicing.

The general organization of the apparatus is such that the sample vial 26 may be lowered into the cylindrical detection well 22 during a "count" cycle to a position where the light scinitillations occurring in the sample are detected and measured by the photomultipliers PM1, PM2. Since the latter are particularly sensitive to spectral radiation, provision is made for insuring that they are maintained in a light-tight housing at all times, so that the only light to which they are subjected is the scintillations occurring in the sample 26. It is for this reason that the upper end of the detection well is closed by a shutter mechanism 31 at all times other than when a sample is being loaded into the detection well 22 or ejected out of the detection well. While the particular means employed for delivering successive sample vials 26 to the apparatus is not critical to the present invention, those skilled in the art will appreciate that numerous types of automatic, semi-automatic, or manual sample changers or conveyors could be employed to bring successive samples to a point of registration with the upper end of the detection well 22. A typical completely automatic sample changer with which the present invention finds particularly advantageous use is disclosed in the copending application of Lyle E. Packard, Roy E. Smith, Alfred A Munn and Edward F. Polic, Ser. No. 273,189, filed Apr. 15, 1963 and now U.S. Patent No. 3,257,561 A typical sample elevator mechanism is described in the aforementioned Olson application, Ser. No. 273,110, filed Apr. 15, 1963, now U.S. Patent No. 3,198,948, the relevant details of which are included here for completeness. However, while it will be understood that the present invention can find use with a wide range of different types of automatic sample changers and sample elevator mechanisms, it is by no means exclusively limited to use with such sample changers. Indeed, the present invention will also find use in the less expensive manual versions of detection apparatus wherein successive samples are delivered to a point of registration with the detection well by hand.

Referring again to FIG. 1 the bases of the photomultipliers PM1 and PM2 are received within sockets 35, 35a and are inserted into the arms 24, 25 from the outer extremities thereof. To this end, the apparatus includes a pair of end caps 36, 37 which are hinged at their tops to the arms for pivotal movement about a vertical axis. The outer portion of the apparatus comprises a casing which may be made, for example, of aluminum and which is filled with suitable shielding material characterized by its ability to inhibit penetration of environmental background radiation. Such shielding material generally takes the form of lead and is here designated by the reference character 39. The lead shield defines a cylindrical transverse bore 40 into which the photomultipliers are coaxially inserted. Additional graded shielding means, generally indicated at 41 (FIG. 2) may be inserted into the bores 40 in surrounding relationship to the photomultipliers, although it will be understood that such additional shielding means is not critical to the present invention.

The detection well 22 includes an upper cylindrical bore 22a formed in the housing and the lead shield of base assembly 21. An enlarged tubular sleeve 50 extends upwardly into the housing and is secured in place by means of suitable threaded fasteners 51. The upper end of the tubular sleeve 50 is stepped, and serves to support a generally cylindrical collar 52, the latter having an upwardly extending generally rectangular flange 54. A vertical bore 22c, advantageously having a lesser diameter than the bore 22a (with conical surface 22b providing the transition), is formed in the lead 39, collar 52, and flanges 54, the bores 22a and 22c being disposed in coaxial relationship. The flange 54 is further provided with a transverse slot (not shown in the views herein depicted) which extends entirely therethrough and which defines at its opposite ends a pair of windows adapted to be positioned adjacent the light receptive ends of the photomultipliers PM1 and PM2.

In order to maximize the conversion of light energy into electrical energy, a light pipe 58 is positioned in the slot, the light pipe defining a cylindrical vertical bore 22d coaxial with the bores 22a, b, and c, and having the same diameter as the bore 22c. As illustrated in the Olson application, the light pipe 58 is a rectangular prism comprising a pair of complementary mating blocks of light transmissive thermoplastic material having complementary abutting faces shaped to define the bore 22d. The oppositely disposed vertical walls of the light pipe are coupled to the photomultipliers PM1 and PM2 respectively in light transmissive relationship therewith when the block is positioned in the transverse slot. The remaining external walls are either painted or coated with a light reflective material which serves to insure that all light scintillations occurring in the sample 26 are reflected towards the light sensitive elements in the photomultipliers PM1, PM2.

As best illustrated in FIGS. 2 and 5, when the foregoing components are assembled, the bores 22a, b, c and d define a substantially continuous elevator shaft or well 22 which houses an elevator platform 62 adapted to support the sample vials 26 and to effect vertical reciprocation thereof into and out of the count chamber defined by the light pipe 58. Platform 62 has a flat sample-receiving surface 63 and advantageously has beveled edges as shown.

Provision is made for effecting vertical reciprocation of the elevator platform 62 within the elevator shaft or well 22 so as to selectively load and unload sample vials 26 into and out of the count chamber defined by the light pipe 58, together with means for rendering the apparatus light-tight at all times and at all vertical positions of the elevator platform 62 in the apparatus, yet wherein there is no rubbing contact with the light pipe as the elevator mechanism passes therethrough.

The sample centering device 100 operating in conjunction with the described elevator mechanism is shown in elevation at FIG. 3 and in plan view at FIG. 4. Device 100 is formed from a single sheet of flat, resilient, spring steel or beryllium bronze about ten thousandths of an inch thick, and consists of a flat washer-like central portion 101 with three equally spaced fingers 102a–c and three equally spaced fingers 104a–c located around its periphery and with a central hole 103 adapted to surround and be spaced away from cap 68 (FIG. 2). Fingers 102a–c extend outwardly of central portion 101 and then downwardly at right angles substantially about a diameter equal to the diameter of annular collar 76 (FIGS. 2 and 5), thereby centering the device 100 concentrically about the axis of the collar 76 and the elevator shaft 69.

Referring to FIG. 3, it will be observed that the foregoing construction provides a centering device 100 having an inverted slightly dished, or Belleville shaped configuration.

Sample centering fingers 104a–c extend outwardly of central portion 101 and are advantageously bent in three places, as best shown in FIG. 3. The first bend 105 is in a slight downward direction at the periphery of central portion 101, the second bend 108 is at substantially right angles to the first bent portion 105 and in an upward direction, and the third bend 110 provides an uppermost portion 111 at substantially right angles to the plane of central portion 101. In this form of the invention the diameter of a circle defining the outermost edges of portion 111 is less than the diameter of bore 22 at FIG. 2. Bend 108 is located substantially at a distance equal to or slightly greater than that of sample vial 26 so that the vial fits loosely between the fingers 104a–c. All three of the fingers 104a–c are identical insofar as is commercially possible.

In operation, a sample vial 26 is placed either manually or automatically on the flat surface 63 of elevator platform 62, when the latter is projected outside of well 22. During the elevator lowering portion of the cycle (as will be described presently), the platform 62 and the vial 26 move downward to position the vial within the upwardly extending gripping fingers 104a–104c as shown in FIG. 2. Further downward movement then compresses the centering device 100 between the bottom of platform 62 at the top of collar 76 on inner sleeve 74, thus compressing the central portion 101 and the first bent portion 106 into a generally planar relationship with each other. As a consequence, portions 109 and 111 of fingers 104a–c are urged inwardly to converge or grip sample vial 26 at three equally spaced positions. Vial 26 is, therefore, positioned in the exact center of well 22, where no portions of the vial can rub against the sides of the well and where the light scintillations can be observed equally by photomultipliers PM1 and PM2.

Provision is also made for permitting relative movement between the inner and outer sleeves 74, 75, respectively, as the elevator mechanism is raised so as to clamp the O-rings 79 between the wedge-shaped faces of the collar 76, slide 77 and outer sleeve 75, thus deforming the sealing rings 79 and urging them laterally outward into intimate sealing engagement with the wall of the elevator shaft 22c. To this end, the inner sleeve 74 has rigidly secured to its lower end an annular mounting platform 80 having a pair of diametrically opposed upwardly extending brackets 81, 82. A pair of generally horseshoe-shaped links 84, 85 are pivotally mounted at 86, 88 respectively, to the brackets 81, 82. The lower ends of the links each terminate in a pair of force transmitting links 89 which partially surround the elevator shaft 69 and which are adapted to support a pair of diametrically opposed, downwardly projecting tangs 90 integral with the lower end of the outer sleeve 75. The links 84, 85 are bifurcated to form vertically disposed slots 91, 92, respectively, the links supporting inner rollers 94, 94′, respectively, and outer rollers 95, 95′, respectively with the rollers 94, 95 journalled for rotation in the slot 91 and the rollers 94′, 95′ journalled for rotation in the slot 92. The elevator shaft 69 is provided with an undercut annular groove 96, dimensioned to receive the inner rollers 94, 94′ when the elevator is in its lowermost position (corresponding to FIGS. 5 and 7). In this condition, rollers 94 are maintained snugly within the groove 96 while the rollers 95 engage and roll upon the inner wall 98 of the sleeve 50.

For the purpose of effecting vertical movement of the elevator shaft 69, a reversible electric or fluid operated lifting and lowering mechanism M1 of conventional type is rigidly supported by the shield and base assembly 21 on a motor mounting bracket (FIG. 1). Mechanism M1 is actuated either manually or automatically by external controls of the type described in the Olson application and, since mechanism M1 is coupled to elevator shaft 69, actuation of the former moves the latter to lower and raise a sample 26 into and out of the count chamber defined by the bore 22d in the light pipe 58. As shown symbolically in FIG. 1, mechanism M1 is also coupled to shutter mechanism 31 (FIG. 2) via shutter operating shaft 33.

In carrying out the invention, means are provided for effecting relative movement between the inner and outer sleeves 74, 75 during an "unload" cycle, (i.e., when the elevator shaft 69 is moved upwardly to eject a sample 26), thus serving to compress the O-rings 79 and effecting a light-tight seal which serves to seal the photomultipliers from spectral radiation when the shutter mechanism 31 is open. To this end, when the mechanism M1 is energized during an "unload" cycle, the elevator shaft 69 starts to move upwardly from the position shown in FIG. 5. During the initial portion of the upward movement, the rollers 95 are snugly engaged with the inner surface 98 of the tubular sleeve 50 and thus serve to rigidly clamp the rollers 94 in operative driving relationship with the groove 96 formed in the elevator shaft 69 Since the sleeve 50 prevents outward movement of the rollers 95, the rollers 94 cannot leave the groove 96 in the elevator shaft and, consequently, a vertical drive force is transmitted through the rollers 94 to the links 84, 85 and thence to the mounting plate 80. Consequently, the sleeves 74, 75 slide upwardly as a unit within the elevator shaft 61. However, as best illustrated in FIG. 2, a positioning guide ring 130 mounted in the collar 52 serves to guide the sleeves during their upward movement, thus maintaining the outer sleeve 74, the collar 76, platform 62 and O-rings 79 out of contact with the defining walls of the elevator shaft 22. Since these elements do not contact the walls of the elevator shaft, and in particular, do not contact the thermoplastic material of the light pipe 58, there is no tendency to produce light or other effects which may cause spurious output signals from the photomultipliers PM1–PM2. The arrangement is such that the sealing O-rings 79 are maintained out of contact with the walls of the elevator shaft during their entire transit through the light pipe 58. Of course, during the initial portion of the "unload" cycle, it is not necessary that a light-tight seal be effected by the O-rings 79 since the shutter assembly 31 is still closed.

Provision is also made for pivoting the links 84, 85 outwardly about their respective pivot points 86, 88, thus serving to urge the outer sleeve 75 upwardly relative to the inner sleeve through coaction of the opposed pairs of lugs 89 and the tangs 90. To this end the rollers 95, 95' are journalled to links 84, 85, respectively, at points located outwardly relative to the pivot connections 86, 88. The arrangement is such that as the rollers 95, 95' initially contact the stop surface 131 defined by the lower end of the collar 52, a force is created which tends to urge the rollers outwardly into an annular groove 132 formed at the upper end of the tubular sleeve 50 (FIG. 2). When this occurs the links 84, 85 pivot outwardly about their respective pivot points 86, 88 and the rollers 94, 94' are freed from the groove 96 formed in the elevator shaft 69, thus permitting continued upward movement of the elevator shaft.

It will be appreciated from the foregoing description, that as the elevator shaft 69 moves upwardly under the influence of the continuously driven mechanism M1, at the instant that the rollers 95, 95' strike the stop surface 131 defined by the collar 52, continued vertical movement of the mounting platform 80 and the integral inner sleeve 74 terminates. Thus, the collar 76 disposed on the upper end of the inner sleeve 74 defines a stop surface for the O-rings 79. As the elevator shaft 69 continues to move upwardly, the links 84, 85 pivot outwardly with the rollers 95, 95' being received within the annular groove 132 formed at the upper end of the sleeve 50. As a consequence of this movement, the opposed pairs of force transmitting links 89 are positively urged upwardly into engagement with the lower surface of the downwardly depending tangs on the outer sleeve 75, thus shifting the outer sleeve upwardly relative to the inner sleeve and deforming the O-rings 79 into light-tight sealing relationship with the walls of the elevator shaft 69 at a point well above the light pipe 58. Of course, as the elevator drive shaft 69 continues to move, the groove 96 formed therein moves upwardly out of registration with the rollers 94, 94' and consequently, the rollers begin to ride on the surface of the elevator drive shaft 69 so as to lock the links 84, 85 in their outward pivoted condition and preventing release of the compressive sealing force exerted on the O-rings. Moreover, the tendency to create a compressive sealing force is enhanced by the provision of the compression spring 78 which exerts downward forces on the inner sleeve 74 and collar 76 tending to oppose the forces created by the upwardly moving outer sleeve 75.

At this point in the "unload cycle," the elevator shaft 69 is moving upwardly and the sample vial 26 supported on the elevator platform 62 is disposed within the bore 22a defined by the housing and lead shield 39. The upper end of the sample vial is still disposed beneath the shutter mechanism 31 and since the latter is still closed, provision must be made for terminating vertical movement of the sample vial 26 while the shutter mechanism is opened. Of course, since the sealing rings 79 are now in intimate light-tight sealing relationship with the walls of the elevator shaft 22c, opening of the shutter mechanism 31 will not subject the photomultipliers to an external source of spectral radiation.

For the purpose of permitting the shutter mechanism 31 to be opened while at the same time maintaining the sample vial 26 in substantially the same position as illustrated in FIG. 2, the exemplary elevator mechanism includes a "lost motion" connection which allows the elevator shaft 69 to continue upwardly without effecting further upward movement of the platform 62. To this end, and referring to FIG. 2, it will be observed that at this point in the "unload cycle" of operation, the bottom surface of the collar 71 which is coupled to the elevator rod 66 is at the bottom of the cylindrical bore 70 but is capable of movement away from the bottom by a distance $x$ (FIG. 5). In like manner, the top surface of the cap 68 is spaced a short distance from the bottom of the platform 62 but is capable of further movement by distance $x$. The compression spring 78 is still compressed, and thus tends to urge the rod 66 and bore 70 into full telescoped relation—that is, the spring 78 tends to hold the platform 62 in snug conformity to the upper end of the stationary inner sleeve 74 while the elevator shaft 69 moves upwardly from the position shown in FIG. 5 to the solid line position shown in FIG. 2. It is during this period of vertical elevator shaft movement that the shutter mechanism 31 is opened and, thereafter, continued upward movement of the elevator shaft 69 serves to directly drive the elevator platform 62 through coaction with the cap 68 from the solid line position shown in FIG. 2, to the upper position represented by the phantom lines wherein the elevator platform 62 is disposed well above the upper surface 29 of the shield and base assembly.

During the time when the elevator shaft 69 is moving upward from the position shown in FIG. 5 until just before it reaches that of FIG. 2, fingers 104 of sample centering device 101 are maintained in resiliently gripping relationship with the bottom of sample vial 26 by the compressive action of the bottom of platform 62 against the top of annular collar 76. (Spring 78 is sufficiently stiff to flatten portion 106 of fingers 104.)

As elevator shaft 69 continues moving upward it moves into the position shown in solids lines in FIG. 2. At this point platform 62 has moved upwardly away from the top of collar 76, permitting portion 106 of fingers 104 to return to their relaxed downwardly-bent position and so release fingers 104 from vial 26. It will be observed that in this form of the invention release of fingers 104 occurs in the enlarged bore 22a of well 22, that is, above tapered surface 22b, to prevent fingers 104 from contacting the walls of elevator well 22.

For the purpose of providing an effective light-tight seal for the detection apparatus 20 when the apparatus is in a counting cycle of operation, the exemplary shutter mechanism 31 provides an effective tortuous path which is, for all practical purposes, substantially impenetrable by spectral radiation when the shutter is in the closed position. The shutter mechanism 31 forms no part of the present invention and may take any of several forms, one of which is described in the aforementioned Olson application. Consequently only a brief description will here be given. Shutter mechanism 31 may be actuated manually or automatically, the latter mode being in synchronism with the operation of mechanism M1 via shutter operating shaft 33 (FIG. 1). In any event, shutter mechanism 31 is opened or closed, as the case may be, during the "lost motion" period while the elevator shaft 69 is ascending or descending.

As suggested in FIG. 2, the shutter mechanism 31 comprises a plurality of fixed blades secured in recess 30 (FIG. 1) and a plurality of interleaved pivotable blades (not shown) mounted on shutter operating shaft 33, which in turn is rotated by mechanism M1. The fixed blades are provided with a series of sample transmitting apertures in register with each other, each aperture having the same diameter as bore 22a.

The movable shutter blades are mounted for pivotal movement about the axis of shutter operating shaft 33 from a position totally closing the upper end of the elevator shaft to a position totally opening the elevator shaft and permitting passage of a sample therethrough. When in the closed position, the light path through the shutter mechanism 31 is a substantially tortuous path defined by the coacting faces between the interleaved fixed and pivotable blades. To facilitate sliding movement of the blades relative to one another, they are preferably made of a material having a relatively low coefficient of sliding friction, for example, a relatively hard plastic material. In order to effect pivotal movement of the movable blades in unison, the blades are keyed to shaft 33, thus serving to clamp the movable blades together.

Provision is made for effecting pivotal movement of the movable shutter blades as an incident to upward movement of the drive shaft and during the time that the elevator shaft 69 is moving through its "lost motion" connection to the elevator platform. To this end, shutter operating shaft 33 is rotated (by a cam arrangement described in the Olson application) during upward movement of the elevator shaft 69 at the same time that the elevator shaft starts to move through its "lost motion" connection. As the elevator shaft 69 continues upwardly through a linear distance $x$ corresponding to the permissible amount of "lost motion" provided by the connection shown in FIG. 5, the operating shaft 33 serves to shift the shutters from their fully closed position to their fully open position. At this point, the shutter mechanism 31 is completely open and when the upper end of the cap 68 bottoms on the lower surface of the elevator platform 62, continued upward movement of the shaft 69 will serve to raise the sample vial upwardly through the now open shutter mechanism to the phantom position shown in FIG. 2.

Of course, those skilled in the art will appreciate that during a "sample load" cycle when the elevator mechanism is moving downwardly, the synchronous actuation of the sample centering device 102 and the shutter mechanism 31 is substantially the same as described above. During this cycle of operation, shutter operating shaft 33 (FIG. 1) will initially commence closing shutter 31 (FIG. 2) at approximately the same time that the elevator platform 62 bottoms against the sample centering device 102 and the upper end of the inner sleeve 74. Consequently, during the time that the shaft 33 is operating to close the shutter mechanism 31, the elevator shaft 69 moves downwardly a distance $x$ corresponding to its "lost motion" connection. Thus, the O-ring seals 79 remain expanded in light-tight sealing relationship with the elevator shaft 61 until the shutter mechanism 31 is completely closed.

Referring to FIG. 2, it will be noted that the downwardly extending tangs 90 integral with the outer sleeve 75 are provided with laterally projecting bosses, each of which serves to support an upwardly extending, spring loaded pin 172. The arrangement is such that when the elevator shaft moves upwardly and the links 84, 85 are pivoted outwardly, the pin 172 bottoms on the stop surface 131 and is compressed against the bias provided by the springs. Consequently, as the elevator shaft returns to the position shown in FIG. 5, the spring loaded pins 172 tend to urge the bosses downwardly relative to the stop surface 131. This serves to pivot the links 84, 85 and return the rollers 94, 94' inwardly into operative engagement with the groove 96 formed in the elevator shaft. Thus, as the elevator shaft 69 continues downwardly to its "sample loaded" position, the rollers 95, 95' are pivoted inwardly and ride along the inner surface 98 of the tubular sleeve 50. This serves to again lock the inner and outer sleeve 74, 75 into operative engagement with the elevator shaft 69 and, the entire assembly moves downwardly as a unit. At the instant that the spring loaded pins 172 urge the links 84, 85 inwardly, the outer sleeve 75 moves downwardly relative to the inner sleeve 74, thus freeing the O-rings 79 from the deforming forces and permitting them to return to their normal nonexpanded position. Therefore, as the elevator mechanism 64 moves downwardly, the O-ring seals are maintained out of contact with the plastic light pipe 58, thus insuring that no spurious signals are produced in the photomultiplier as a result of rubbing contact with the seals, and at the same time substantially prolonging the life of the seals since they are not subjected to wear.

Figure 7:
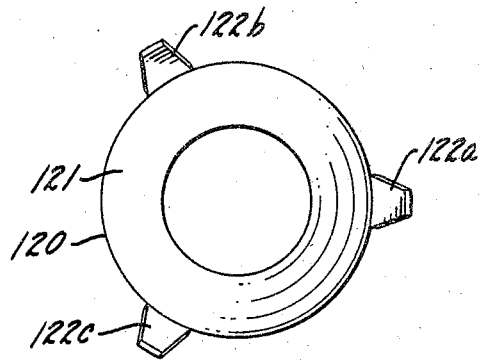

Referring now to FIGS. 6 and 7 conjointly, there has been depicted a slightly modified type of centering device 120 which is somewhat similar in construction and mode of operation to the centering device 100 described above and also embodying the present invention. In view of the similarity between the two exemplary centering devices of the invention, like parts in both forms of the invention will be designated by identical reference numerals and those parts not common to the two systems will be designated by different reference numerals.

As shown in FIG. 6, the modified form of centering device 100 (which is preferably formed of the same resilient spring material as is the device 100 shown in FIG. 3) includes an annular central portion 121 having an inverted dished or Belleville shaped vertical cross section. A plurality of equally spaced fingers (three such fingers 122a, 122b, and 122c being shown in the drawings) are formed integrally with the central portion 121 and are disposed about the periphery of the latter, the fingers being substantially perpendicular to the portion 121 at the plane of tangency passing through the base of the fingers. It will, of course, be understood as the ensuing description proceeds, that in this form of the invention, as in the form shown in FIG. 3, more than three upwardly projecting fingers could be provided if desired. As here shown the fingers 122a–122c taper slightly towards their free extremities and, when the device 120 is in its natural or relaxed state (as shown in FIG. 6), the fingers diverge from one another with the free extremities of the fingers terminating in a circle having a diameter substantially greater than the diameter of the central portion 121.

Figure 8:
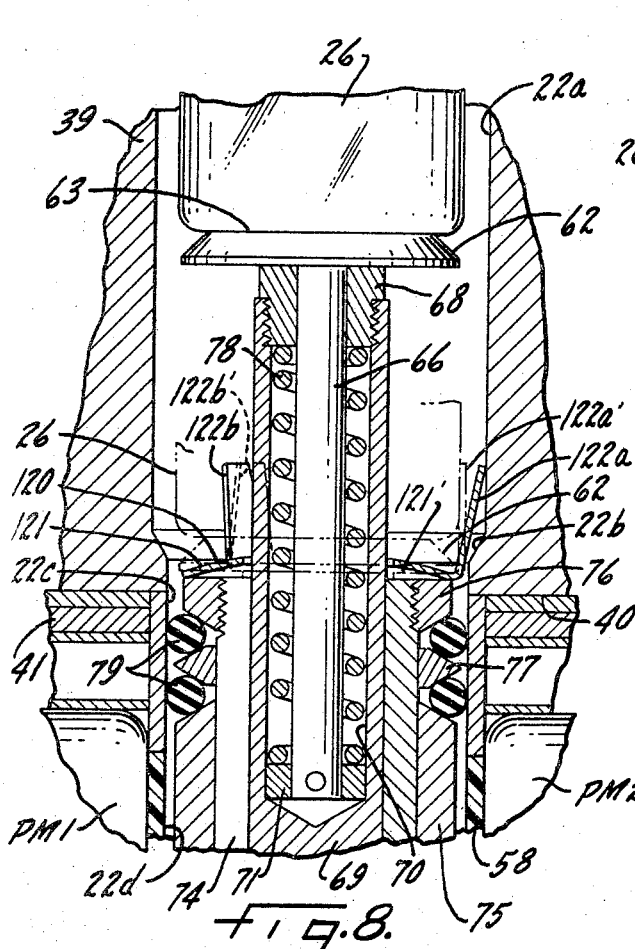
FIG. 8 is an enlarged, fragmentary, vertical sectional view of the apparatus shown in FIG. 1 here depicting the modified centering device of FIGS. 6 and 7 in solid lines prior to actuation thereof, and in phantom lines after actuation thereof.

As best shown in FIG. 8, the arrangement is such that the modified centering device 120, when positioned beneath the elevator platform 62 and on the collar 76 in surrounding relation to the elevator drive shaft 69, serves to precisely center itself relative to the axis of the detection well 22. Thus, the diverging tips of the fingers 122a–122c are preferably so dimensioned that when the centering device is in the solid line relaxed position shown in FIG. 8, the tips of the fingers engages the wall defining the bore 22a, thereby accurately centering the annular central portion 121 relative to the axis of the detection well. However, since the points of contact between the device 120 and the bore 22a are above the seals 79, spectral radiation that might be produced incident to rubbing contact, if any, between the fingers and the bore 22a will not produce spurious signals from the photomultipliers.

In operation, and assuming that the O-rings 79 are expanded into sealing engagement with the bore 22c, the elevator platform 62 is free for vertical reciprocation above the stationary seal defined by the the O-rings for the purpose of introducing and ejecting sample vials 26 in the manner heretofore described. During a sample loading cycle, the elevator platform 62 will bottom on the bowed spring portion 121, thus compressing and flattening the latter between the platform 62 and the collar 76 as indicated at 121' in FIG. 8. This serves to draw the tips of the fingers 122a–122c inwardly into substantially parallel vertical positions, e.g., the phantom position 122a' shown in FIG. 8. In this position, the fingers snugly embrace the sample vial 26 and center the latter relative to the axis of the detection well 22. And, of course, since the biasing force exerted on the device 120 by the platform 62 is in a downward direction, the device remains accurately centered even though the fingers 122a–122c no longer contact the bore 22a. It will, of course, be appreciated that, consistent with the principal objectives of the invention, the centering device 120 is preferably so dimensioned that when in the vial centering position, the entire elevator assembly, including the device 120, can reciprocate within the light pipe 58 without rubbing contact therewith, thus insuring that no spurious signals are produced by the photomultipliers PM1, PM2. During a sample unloading cycle, once the O-rings 79 are expanded and the platform 62 starts to move upwardly relative to the collar 76, the device 120 returns to its relaxed bowed state, whereupon the tips of the fingers 122a–122c again engage the wall defining the bore 22a so as to insure that the spring centering device remains accurately centered.

Figure 9:
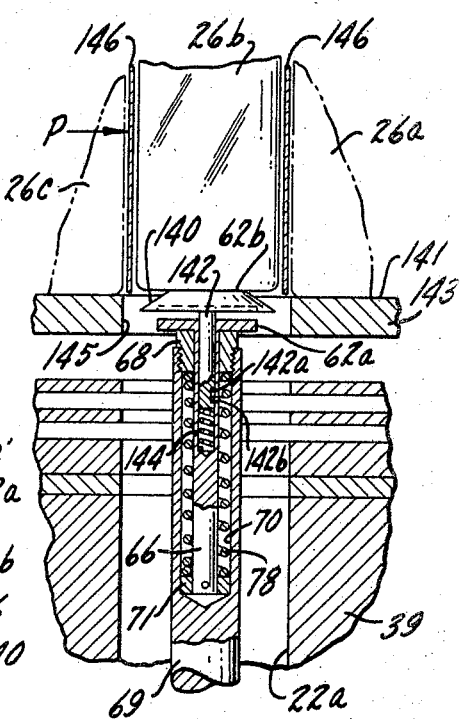
FIG. 9 is an enlarged fragmentary, vertical sectional view of an improved aspect of the apparatus.

Turning now to FIGURE 9, an enlarged fragmentary sectional view of an improved sample elevator mechanism is shown, this improvement being particularly useful in properly positioning sample vials when an automatic mechanism is used to feed a series of samples to detection well 22a. This improvement, as will appear, advantageously is used in conjunction with the previously described sample centering device, although it is not restricted to sample transferring mechanisms employing a means to center the samples. The number system of FIG. 9 corresponds to that of FIGS. 1 through 8.

Shown schematically in FIG. 9 is a magazine-type feed mechanism which delivers a series of samples 26a, 26b, 26c to a point in registration with bore 22a of the detection well. A compelling force P is intermittently applied to position each of sample vials 26 in register with the bore and onto a platform associated with elevator shaft 69. However, in the embodiment of FIG. 9 elevator platform 62 is divided into a lower portion or platform 62a and an upper portion or platform 62b. Lower platform 62a is integral with rod 66, which extends downwardly axially of shaft 69. Spring 78 urges lower platform 62a into a retracted position when elevator shaft 69 is extended in the position shown in FIG. 9.

Upper platform 62b has a generally disc shape with a flat sample-receiving upper surface and an inclined or beveled edge surface 140. An integral extension of upper platform 62b extends downward and forms a floating shaft 142 that is received in an axial hole in rod 66 and slidably retained captive therein. To this end, the shaft 142 is provided with a longitudinally extending blind keyway slot 142a adapted to receive the inwardly projecting extremity of a set screw 142b. Rod 66, as noted earlier, is integral with lower platform 62a. If desired, a recess may be cut into the bottom of upper platform 62b so as to receive lower platform 62a. A spring 144 is positioned within the axial recess or bore of rod 66 and urges floating shaft 142, together with its associated upper elevator platform 62b, in an upward direction. The spring 144 is preferably preloaded so as to insure that a sufficient upward biasing force is provided to normally maintain the platform in the upper limit position defined by co-action of the set screw 142b and and the base of the slot 142a even though the platform has positioned thereon a full sample vial.

When a sample feeding device is employed, the sample vials 26a, 26b, 26c are moved in a direction perpendicular to bore 22a of the detection and transferring well. Planar surface 141 of table 143 (which might, merely by way of example, be the upper surface of a gate associated with a compartmented tray of the type disclosed in the aforesaid co-pending application of Packard et al., (Ser. No. 273,189) defines the bottom or lower surface of the sample feeding device, and is vertically positioned so that the platform 62b is received within an aperture 145 with the plane 141 intersecting inclined surface 140 of upper elevator platform 62b when no sample is on the upper sample-receiving surface of platform 62b. Thus, as each sample is moved into registration with the sample detection and transferring well (that is, into the position of sample 26b) the sample vial may easily slide up the inclined surface 140 and onto the upper surface of platform 62b.

Similarly, since the upper surface of the platform 62b extends above the plane 143, those samples being ejected from the detection well are free to slide off the platform 62b without danger of engaging the edge of the table or gate 143 defining the aperture 145, thus insuring that jamming does not occur. And, of course, since the upper platform 62b is, by virtue of the bias afforded by spring 144, a floating platform, it will be readily cammed downwardly by any rigid or unyielding portion of the magazine-type feed mechanism such, for example, as the dividing walls 146 between adjacent compartments in a compartmented conveyor-like sample support. Indeed, in some instances the sample vial being conveyed to the platform 62b may, itself, serve to cam the platform downwardly.

It will be appreciated from the foregoing that the provision of a floating platform having a beveled edge will be particularly advantageous when using automatic or semi-automatic sample changers since it eliminates the need for precisely positioning the upper surface of the elevator platform with respect to the upper surface of the sample support associated with the automatic conveyor. Absent such a construction it would be necessary to take precautions to insure that the two surfaces are substantially flush as the sample vials 26a–26c are slid laterally—otherwise there would be a real danger of jamming the equipment due to inability of the new vial to slide onto the elevator (where the elevator is too high) or the old vial to slide off the elevator (where the elevator is too low). Moreover, since the spring preload is such that the upper platform 62b is normally biased to its upper limit position, those skilled in the art will appreciate that the successive sample vials will all stop in precisely the same position relative to the photomultipliers PM1, PM2 irrespective of the weight of the test sample. Nevertheless, when the elevator platform 62b is in the "unload" position, the added downward camming force resulting due to misalignment between the platform 62b and the sample conveyor will serve to overcome the preload on spring 144, thus camming the platform 62b downwardly into proper alignment with plane 141.

I claim as my invention:

1. In an apparatus for detecting and measuring radioactivity emanating from a sample, the combination comprising: (A) a sample-transferring well, (B) a detection chamber at a lower portion of said well and centered with respect thereto, (C) an elevator centered in said well and movable in said well for transferring a sample into said detection chamber, (D) means for centering a sample on said elevator comprising a resilient spring-like member centrally carried by said elevator and having an inverted dished central portion and at least three upstanding spaced sample-gripping fingers disposed about the periphery of said central portion, said fingers diverging from one another towards their free extremities so that biasing of said dished central portion toward a planar state urges the tips of said fingers inwardly, and (E) means for biasing said dished central portion to thereby center said sample with respect to said detection chamber.

2. A sample centering device as set forth in claim 1 further characterized in that said central portion is annular.

3. In an apparatus for detecting and measuring radioactivity emanating from a sample, the combination comprising: (A) a sample-transferring well, (B) a detection chamber at a lower portion of said well and centered with respect thereto, (C) an elevator centered in said well and movable in said well for transferring a sample into said detection chamber, (D) a sample-centering device centrally carried by said elevator comprising a central portion, at least three spaced sample gripping fingers, and resilient means joining said portion and said fingers, said resilient means extending downwardly and outwardly from said central portion and defining therewith an inverted dished configuration, said fingers being substantially perpendicular to said resilient means so that the free extremities of said fingers diverge from one another whereby biasing of said resilient means towards a position in which said resilient means and said central portion lie in a common plane urges the tips of said fingers inwardly, and (E) means for biasing said resilient means to thereby center said sample with respect to said elevator and therefore with respect to said detection chamber.

4. In an apparatus for detecting and measuring radioactivity emanating from a sample, the combination comprising: (A) a sample-transferring well, (B) a detection chamber at a lower portion of said well and centered with respect thereto, (C) an elevator centered in said well and movable in said well for transferring a sample into said detection chamber, (D) a sample-centering device centrally carried by said elevator comprising a central portion, and at least three resilient spaced-sample-gripping fingers, each having a first portion extending outwardly of said central portion in a slight downwardly direction and having a second portion extending upwardly from said first portion at about right angles to said central portion whereby returning the downwardly extended portion to the plane of said central portion urges the upwardly extending portion inwardly, and (E) means for returning said downwardly extended portion to the plane of said central portion to thereby center said sample with respect to said sample-centering device, said elevator, and said detection chamber.

5. A sample-centering device comprising a flat central portion, at least three spaced centering tabs extending downwardly from said central portion, and at least three-resilient spaced sample-gripping fingers, each having a first portion extending outwardly of said central portion in a slight downwardly direction and having a second portion extending upwardly from said first portion at about right angles to said central portion whereby returning the downwardly extended portion to the plane of said central portion urges the upwardly extending portion inwardly.

6. A sample-centering device formed of a single sheet of resilient material and having a flat central portion with a central hole therein, at least three spaced centering tabs extending downwardly from said central portion, and at least three resilient spaced sample-gripping fingers, each having a first portion extending outwardly of said central portion in a slight downwardly direction and having a second portion extending upwardly from said first portion at about right angles to said central portion whereby returning the downwardly extended portion to the plane of said central portion urges the upwardly extending portion inwardly.

References Cited

UNITED STATES PATENTS 2,963,256 12/1960 Borah.
2,968,888 1/1961 Borah _____ 248–346.1

FOREIGN PATENTS 208,601 5/1940 Switzerland.

ALBERT I. MAKAY, *Primary Examiner.*

U.S. Cl. X.R.

250—50